CHARLES A. FULCHER
FRANCIS J. HEUSER
DAVID M. ROBERTS
ROBERT L. RYNEARSON
CHARLES H. WALDHAUER JR.

BY Roger W. Jensen

ATTORNEY

Oct. 4, 1960     C. A. FULCHER ET AL     2,954,691
CONTROL APPARATUS
Filed Sept. 19, 1958     3 Sheets-Sheet 2

CHARLES A. FULCHER
FRANCIS J. HEUSER
DAVID M. ROBERTS
ROBERT L. RYNEARSON
CHARLES H. WALDHAUER JR.

BY Roger W. Jensen

ATTORNEY

CHARLES A. FULCHER
FRANCIS J. HEUSER
DAVID M. ROBERTS
ROBERT L. RYNEARSON
CHARLES H. WALDHAUER JR.

BY Roger W. Jensen

ATTORNEY

… … … 1

2,954,691

CONTROL APPARATUS

Charles A. Fulcher, Woodland Hills, Francis J. Heuser, Westchester, David M. Roberts, Los Angeles, and Robert L. Rynearson and Charles H. Waldhauer, Jr., Pacific Palisades, Calif., assignors to Minneapolis-Honeywell Regulator Company, Minneapolis, Minn., a corporation of Delaware Filed Sept. 19, 1958, Ser. No. 762,038

3 Claims. (Cl. 73—178)

This invention pertains generally to gyroscopic apparatus and more specifically to a multiple rate gyro package or assembly with means provided for automatically testing the individual gyros in the assembly.

The control system for present aircraft including manned and unmanned vehicles are extremely complex and the trend is for more complexity. In many applications it is desirable to be able to check a control system for an aircraft while the craft is on the ground or in its unlaunched state. The present invention provides a means for applying a mechanical input about the input axes of a plurality of rate gyroscopes mounted on a platform so that the individual gyroscopes can be tested. The present invention provides a platform upon which the rate gyroscopes (usually three) are mounted so that their input axes are at mutually perpendicular angles to each other. The platform is mounted on a base member or support member through a pivotal connection and is normally locked with respect to the base. The pivotal axis is arranged to be at a preselected angle relative to each of the input axes. Motor means mounted on the base and connected to the platform when energized serves to oscillate the entire platform about the pivotal axis relative to the base. A certain component of the rotation or oscillation about the pivotal axis is applied around each of the input axes, the magnitude of the component depending upon the angular relationship between the individual input axis and the pivotal axis. The present invention provides a control system for the checking of the individual gyroscopes which insures that the platform is brought back to its initial position relative to the base.

It is an object of our invention therefore to provide an improved gyroscopic apparatus.

Another object of our invention is to provide a rugged and reliable arrangement for self checking a plurality of gyroscopes.

Another object of the invention is to provide a means of self checking a rate gyro package by applying mechanical inputs about all of the gyro input axes simultaneously.

These and other objects of our invention will become apparent from the reading of the following specification and appended claims, in conjunction with the accompanying drawings in which:

Figure 1:
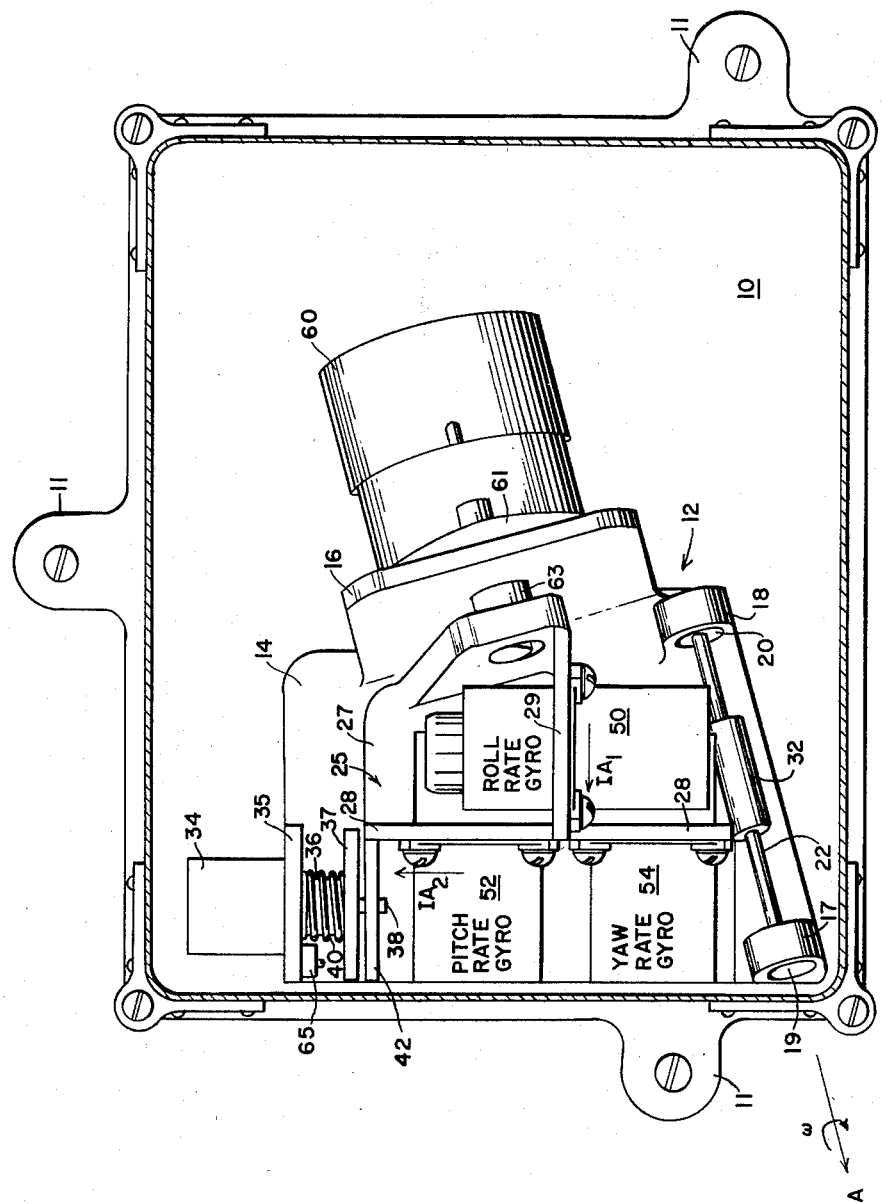
Figure 1 is a top view of a rate gyro package including a self checking mechanism.

Referring to Figure 1, reference numeral 10 designates a main base member provided with lug portions 11 for mounting base 10 to a maneuverable craft such as an aircraft. A sub-base is mounted on the main base 10 and is generally designated by reference numeral 12, sub-base 12 being secured to the main base 10 by suitable means, not shown. The sub-base 12 includes a main flat portion 14 which extends generally parallel to the main base 10 and also includes an upstanding flange like portion 16 near the right hand side thereof as shown in Figure 1. The sub-base 12 further includes a pair of shaft supporting flanges or lugs 17 and 18 in which are disposed suitable bearing means 19 and 20 respectively which define a pivotal axis for a rod or axle member 22, the ends of which fit into bearings 19 and 20.

A platform member is generally identified by reference numeral 25 and comprises a flat portion 27 which in its normal position is maintained generally parallel with the main portion 14 of the sub-base 12. A first platform flange 28 is provided and extends generally perpendicular to the flat portion 27 of the platform and may be secured thereto either through auxiliary fastening means (not shown) or may be integral therewith. A second platform flange member 29 also extends generally perpendicular to the flat portion 27 of the platform 25 and in addition is generally perpendicular to the first platform flange portion 28.

Figure 2:
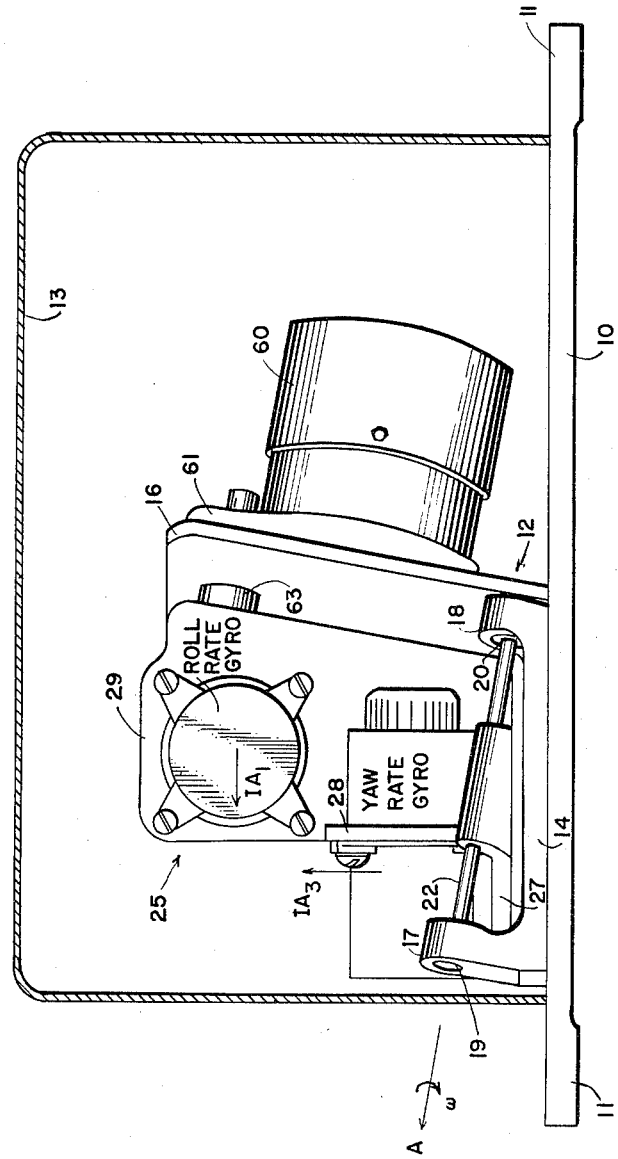
Figure 2 is a side view of the apparatus shown in Figure 1.

Platform 25 further includes a hub portion 32 formed on the lower portion of the flat member 27 as shown in Figure 1 and provided with a suitable aperture therethrough for permitting the axle 22 to extend therethrough. Platform 25 is thus fixed relative to the sub-base 12 (and thus to the main base 10) as far as translational motion is concerned through the pivotal connection between hub portion 32, axle 22, bearings 19 and 20, and the lug portions 17 and 18. The pivotal connection however does permit the platform 25 to be pivoted for a limited amount of angular displacement relative to the sub-base 12. The platform 25 is normally fixed relative to the sub-base by a locking solenoid 34 which is mounted on a suitable flange member 35 on sub-base 12. The solenoid 34 includes an axially movable assembly including a plunger portion 36, a plate portion 37 and a pin 38 centrally mounted on plate portion 37. A resilient compression means in the form of a spring 40 is positioned around the plunger 36 and between flange 35 and the plate portion 37 of the axially movable assembly. The action of spring 40 is to tend to displace plate portion 37 away from the flange 35. The solenoid 34 and its related moving assembly as shown in Figure 1 is in its deenergized state with the spring means 40 maintaining the plate portion 37 a maximum distance away from the flange 35. In this position the pin member 38 of the moving assembly is inserted through a suitable aperture provided in a flange 42 which is integral with the platform 25 and which extends generally perpendicular to the first platform flange member 28 as well as being perpendicular to the flat portion 27. As shown in Figures 1 and 2 the platform 25 is locked relative to the sub-base 12. When solenoid 34 is energized the moving assembly including the plunger 36, plate member 37 and pin 38 move vertically upward as shown in Figure 1 disengaging the pin 38 from the flange 42 on the platform 25. This releases the platform and permits the platform to be rotated relative to the sub-base 12 by motor means which will be described below.

Three rate gyroscopes are mounted on the platform 25 and are secured thereto by suitable means. These include a roll rate gyro 50, a pitch rate gyro 52, and a yaw rate gyro 54 which are not shown in detail since their exact form is not involved in the present invention. For reference purposes the gyroscopes 50, 52, and 54 may generally be of the type shown in the Sanders Patent 2,817,240. The roll rate gyroscope 50 is mounted in the second platform flange member 29 with its longitudinal or output axis being normal to the flange 29 and with its input axis identified in Figures 1 and 2 as $IA_1$ being in the plane of the paper of Figures 1 and 2. The pitch rate gyro 52 and yaw rate gyro 54 are both mounted in the first platform flange portion 28 with their longitudinal or output axes generally perpendicular to the flange 28. The pitch rate gyro input axis is identified in Figure 1 as $IA_2$ and lies in the plane of the paper of Figure 1 and is perpendicular to the roll rate gyro input axis $IA_1$. The yaw rate gyro 54 is oriented relative to the flange 28 so that its input axis (identified by the reference designation $IA_3$) is in the plane of the paper of Figure 2 and is perpendicular to the input axes $IA_1$ and $IA_2$ of both the roll gate gyro and pitch rate gyro 50 and 52 respectively.

The three rate gyros thus are mounted on the platform 25 with their input axes at mutual perpendicular angles to each other. It will be observed that the rotational axis defined by bearings 19 and 20 and which is labeled in Figures 1 and 2 by the reference vector A is at an angle with the three rate gyro input axes $IA_1$, $IA_2$ and $IA_3$.

A servomotor 60 of any suitable type is secured by suitable means to the flange portion 16 of the sub-base 12. The motor 60 includes a gear box section 61 which has an output shaft which is connected to the platform 25 through an eccentric means or crank 63. When motor 60 is energized, the crank 63 is rotated and the rotation thereof is transmitted to the platform 25 so as to oscillate it about the pivotal axis defined by bearings 19 and 20. The oscillation of the platform 25 would begin from the position as shown in the drawings in the direction of the arrow $\omega$ around the vector A.

Figure 3:
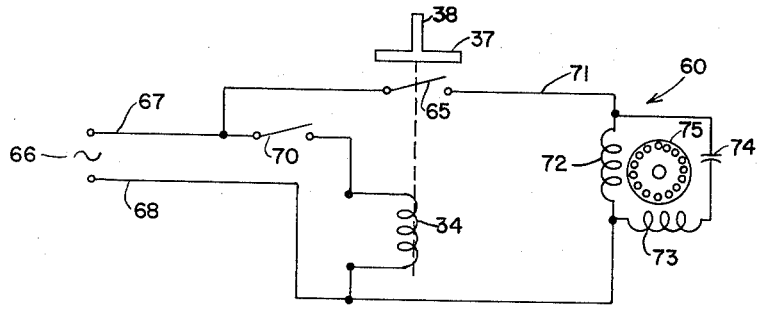
Figure 3 is an electrical schematic wiring diagram of the control system for the self checking means.

Suitable switching means such as a precision snap switch 65 mounted on the flange 35 senses when the moving assembly of the solenoid is in its energized position. The switch 65 is schematically shown in Figure 3 to be a normally open single pole, single throw switch. The solenoid winding 34 is adapted to be connected to a suitable source of power 66 through a pair of suitable leads 67 and 68, the application of power through leads 67 and 68 to the solenoid 34 being controlled through a normally open single pole, single throw switch 70. Lead 67 is also connected to one side of the switching means 65, the other side of which is connected through a suitable lead 71 to one side of the servomotor 60 which is shown to be a split phase induction motor including an in phase winding 72, an out of phase winding 73, a phase shifting condenser 74, and a squirrel cage rotor element 75. The other side of the servomotor 60 is connected to lead 68.

Figure 4:
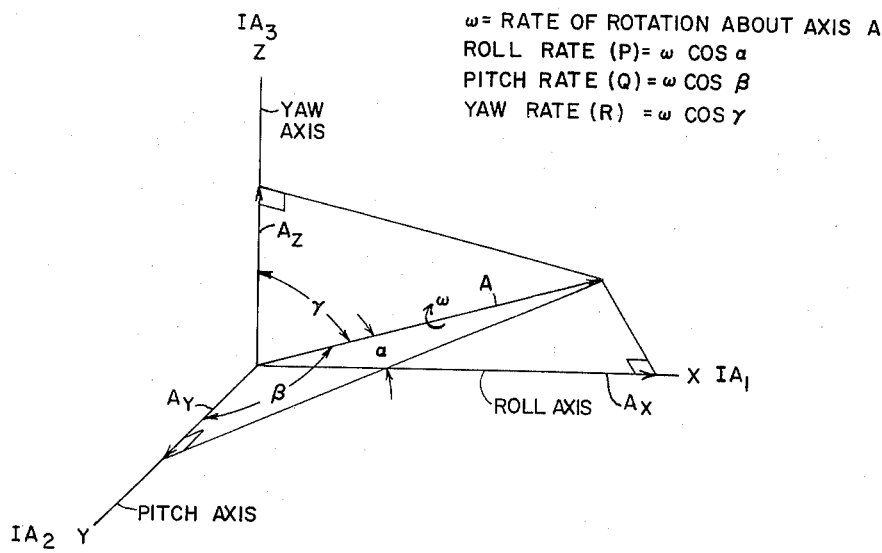
Figure 4 is an orthogonal diagram showing the relationship between the pivotal axis between the platform and base and the various input axes of the three rate gyroscopes shown in Figures 1 and 2.

The normal operation of the control circuit for the self testing mechanism is for switch 70 to be closed when a test is desired so as to energize the solenoid 34. The plunger assembly including plate member 37 and pin 38 are moved upwardly as shown in Figure 1 thus disengaging the pin 38 from the flange 42. The platform 25 is thus free to rotate relative to the sub-base 12 about the rotational axis A. The resilient spring 40 is compressed so as to permit the disengagement of pin 38 from the flange 42. When the solenoid 34 plunger gets to its fully energized position the microswitch 65 is actuated thus completing the circuit from lead 67 to lead 71 so as to energize the servomotor 60, the remainder of the energization circuit for the motor being completed through lead 68. Motor 60 rotates causing the crank 63 to oscillate the platform 25 relative to the sub-base 12. The rotation about the rotational axis A is imparted to the gyros 50, 52, and 54 as a function of the angle between the input axes $IA_1$, $IA_2$, and $IA_3$ respectively and the rotational axis A. The angular relationship between the gyro input axes and the rotational axis A is preselected according to the particular design requirements for the platform. In Figure 4 a typical relationship between the rotational axis A and the gyro input axes is shown. The gyro input axes are shown to coincide with a set of orthogonal coordinates X, Y, and Z, these coordinates corresponding respectively to the input axes $IA_1$, $IA_2$, and $IA_3$. Axes X, Y, and Z may be further identified as (for one particular application) as a roll, pitch, and yaw axes respectively of an aircraft. It will be noted that the rotational axis A between the platform 25 and the sub-base 12 is at an angle to all three input axes. The axis A is designated in Figure 4 as a vector, the length of which is indicative of its instantaneous angular velocity or rate of rotation $\omega$ about axis A. The vector A has components lying along the X, Y, and Z axes, the components being identified respectively as $A_x$, $A_y$, and $A_z$. The vector A subtends angles $\alpha$, $\beta$, and $\gamma$ between the X, Y, and Z axes respectively. The instantaneous rate of rotation about the X, Y, and Z axes (thus inputs about axes $IA_1$, $IA_2$, and $IA_3$ of the rate gyros 50, 52, and 54) may be calculated as indicated in Figure 4 as follows: rotation about X axis $P = \omega \cos \alpha$; rotation about Y axis $Q = \omega \cos \beta$; and rotation about Z axis $R = \omega \cos \gamma$.

It will be appreciated that the rate gyros, 50, 52, and 54 include signal generating means which are not shown and which would be connected to other means on the aircraft for control purposes. For example the rate gyros might very well be connected through amplifying means and servomotor means to control the control surfaces on the aircraft for damping purposes. In the usual mode of operation of the self checking feature for this rate gyro package the gyro spin motors would be energized as well as the signal generators on the gyros being energized. Then the switch 70 would be closed so that the solenoid 34 would be energized to unlock the platform 25 relative to the sub-base 12. The engagement of the plate member 37 with the snap switch 65 would complete the energization circuit to the motor 60 so as to drive through the eccentric linkage 63 and platform 25 relative to the sub-base 12. This would constitute inputs to the rate gyros 50, 52, 54, the individual rates of rotation about the gyro input axes $IA_1$, $IA_2$, and $IA_3$, being proportional to the rate of rotation $\omega$ of the platform 25 about the rotational axis A, as well as to the magnitude of the angles $\alpha$ and $\beta$. The variables $\omega$, $\alpha$, and $\beta$ would be preselected according to the particular application for the apparatus.

The proper performance of the gyros 50, 52, and 54 would be checked during this testing time by any suitable monitoring means such as, for example, instrument means connected to the gyro signal generators or by observing the controlled object directly. When it is desired to terminate the test, switch 70 would be opened to deenergize solenoid 34. Spring means 40 would tend to displace the axially movable assembly to the deenergized position as shown in Figure 1. However, if the platform 25 is not in its normal position relative to the subbase 12, the pin 38 will not register with its cooperating aperture in flange 42. Hence the axially movable assembly will be restrained from moving to the full deenergized position and switch 65 will remain closed. Motor means 60 remains energized until it drives the platform to its normal position. Then pin 38 registers with its cooperating aperture and the axially movable assembly then is permitted to move under the action of spring 40 to its fully deenergized position, this movement opening switch 65 so as to deenergize motor means 60 and locking platform 25 from further rotation relative to sub-base 12.

While we have shown and described a specific embodiment of this invention, further modifications and improvements will occur to those skilled in the art. We desire to be understood therefore, that this invention is not limited to the particular form shown and we intend in the appended claims to cover all modifications which do not depart from the spirit and scope of this invention.

What we claim is:

1. In apparatus of the class described: a support adapted to be mounted on a maneuverable craft; a platform member; a plurality of rate of turn sensing gyroscopes mounted on said platform member so that the gyroscope input axes are mutually perpendicular with each other; means pivotally mounting said platform member on said support for rotation about a platform rotational axis, said platform rotational axis being at fixed angles with respect to the input axis of each of said gyroscopes; rotatable motor means mounted on said support; eccentric connection means connecting said motor means to said platform member; means normally locking said platform member in a preselected angular position about said platform rotational axis relative to said support; means for disabling said locking means; and means operated as a result of said locking means being disabled for energizing said motor means so as to oscillate said platform about said platform rotational axis relative to said support so as to apply rotational inputs about the input axes of said plurality of gyroscopes.

2. In apparatus of the class described: a support; a platform member; a plurality of rate of turn sensing gyroscopes mounted on said platform member so that the gyroscope input axes are mutually perpendicular with each other; means pivotally mounting said platform member on said support for rotation about a platform rotational axis, said platform rotational axis being at fixed angles with respect to the input axis of each of said gyroscopes; rotatable motor means mounted on said support; eccentric means connecting said motor means to said platform member; means normally locking said platform member in a preselected angular position about said platform rotational axis relative to said support, means for disabling said locking means and for energizing said motor means so as to oscillate said platform about said platform rotational axis relative to said support so as to apply rotational inputs about the input axes of said plurality of gyroscopes.

3. In apparatus of the class described: a support; a platform member; three rate of turn sensing gyroscopes mounted on said platform member with the gyroscope input axes being mutually perpendicular with each other; means pivotally mounting said platform member on said support for rotation about a platform rotational axis, said platform rotational axis being at fixed angles with respect to the input axis of each of said gyroscopes; motor means on said support; eccentric connection means connecting said motor means to said platform member; means normally locking said platform member in a preselected angular position about said platform rotational axis relative to said support; means for disabling said locking means; and means operated as a result of said locking means being disabled for energizing said motor means so as to rotate said platform about said platform rotational axis.

References Cited in the file of this patent

FOREIGN PATENTS 558,374     Great Britain _____ Dec. 3, 1944